Jan. 15, 1924.

J. H. HENRY 1,480,821

OPERA GLASS SUPPORT

Filed June 13, 1922

Inventor:
James H. Henry
by John W. Llarley,
Attorney.

Patented Jan. 15, 1924.

1,480,821

UNITED STATES PATENT OFFICE.

JAMES H. HENRY, OF BALTIMORE, MARYLAND.

OPERA-GLASS SUPPORT.

Application filed June 13, 1922. Serial No. 567,967.

*To all whom it may concern:*

Be it known that I, JAMES H. HENRY, a citizen of the United States, residing at Baltimore, in the State of Maryland, have invented certain new and useful Improvements in Opera-Glass Supports; and I do hereby declare the following to be a full, clear, and exact description of the invention, such as will enable others skilled in the art to which it appertains to make and use the same.

My invention relates to opera glass supports.

Among the objects of my invention are:—

To provide an opera glass support which can be removably secured to the head of the wearer and adjusted to fit the configuration thereof.

To provide an opera glass support of the character described which can be readily folded into a small compass.

To provide an opera glass support having a nose guard adjustable to fit the bridge of the nose.

To provide an opera glass for use with my improved support of short length and having an adjustable objective glass.

These and other objects of my invention will become apparent in the following specification, reference being had to the accompanying drawings, and the novel means by which said objects are effectuated will be definitely pointed out in the claims.

In the drawings:—

Figure 1:
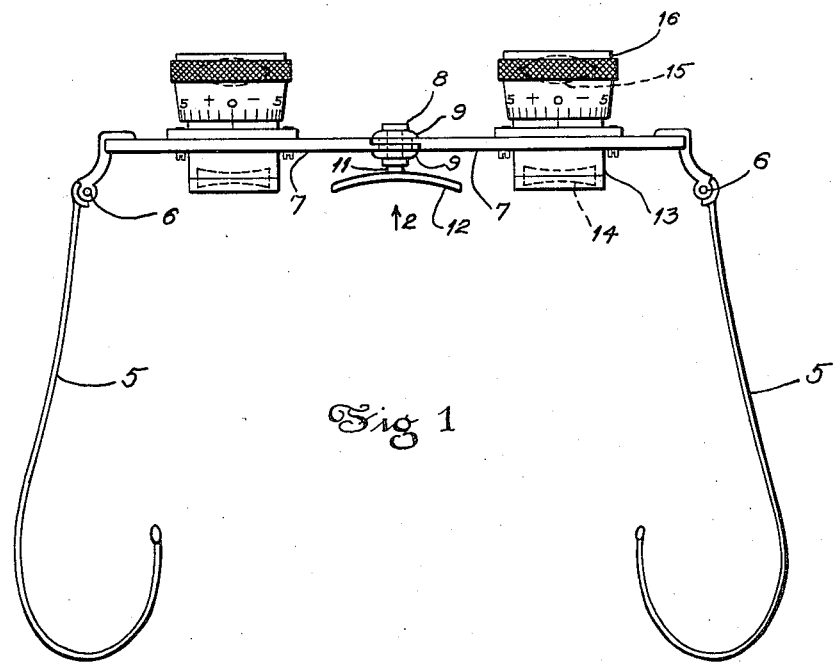
Figure 1 is a plan view of my improved support.
Figure 2:
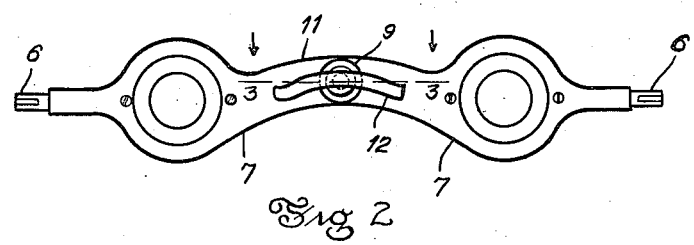
Fig. 2 is a view of the parts shown in Fig. 1 looking in the direction of the arrow 2 in said figure.
Figure 3:
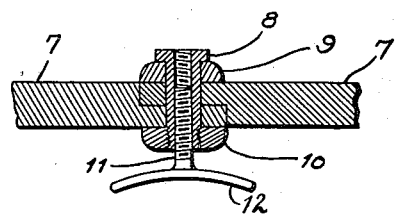
Fig. 3 is an enlarged section along the line 3—3 in Fig. 2 looking in the direction of the arrows.

5 represents the temples of my improved support which are each hinged as at 6 to a section 7 of the frame. The sections 7 are articulated together by the screw 8 which passes freely through the holes in the washer 9 and sections 7 and is threaded into the nut 10, thus securing said sections together and providing for any desired degree of friction between the abutting surfaces of said sections in order to insure that said sections will not inadvertently move when the opera glasses are in use.

The screw 8 is provided with a threaded hole in which is screwed the stem 11 of the nose guard 12. The nose guard 12 is made of any approved shape adapted to rest upon the bridge of the nose.

Each of the opera glasses is provided with the tubular portion such as 13 secured to the bridge 7 and provided with a double concave eye piece 14. The objective glass 15 is mounted in the tube 16 and the latter is mounted in any approved manner upon the tube 13, as for instance, by being threaded thereupon, in order that the distance between the glasses 14 and 15 may be varied to suit the distance of the bridge of the nose of the user.

The manner of use of my improved support is as follows:—

The guard 12 is placed upon the nose and the temples 5 around the ears of the wearer. If the adjustment is not satisfactory the guard 12 may be moved closer to the section 7 or further therefrom by bending it so that its stem 11 will screw into or out of the screw 8. When this adjustment is completed, the eye pieces 15 may be adjusted to the proper focus by turning the tube 16.

Thus it will be seen that I provide a simple, cheap, efficient and light opera glass support which is adapted for the ordinary uses to which opera and field glasses are used and is especially suitable for use by surgeons in performing operations, for while it is evident that while I have shown the ordinary telescope of Galileo as mounted in the section 7, it is evident that these may be replaced by suitable compound magnifying glasses.

I claim:—

1. In an opera glass support, the combination of frame sections, a screw for securing said sections together and comprising a threaded hole, a nose guard having a stem threaded in said hole and temples secured to said sections.

2. The combination of a support comprising a frame having a threaded hole, a nose guard having a stem threaded in said hole and means for securing said frame to the head, with opera glasses having eye pieces in fixed relation to said frame and objectives in adjustable relation thereto.

In testimony whereof, I affix my signature.

JAMES H. HENRY.